(12) United States Patent
Meunier et al.

(10) Patent No.: US 6,317,663 B1
(45) Date of Patent: Nov. 13, 2001

(54) LANDING AID DEVICE, ESPECIALLY FOR ANTI-GROUND-COLLISION ALERT VETOING

(75) Inventors: Hugues Meunier, Les Essarts le Roi; Gerard Lepere, Aubervilliers; Vincent Gauge, Versailles; Eric Leonardi, Neauphle le Chateau; Christophe Roger, Suresnes, all of (FR)

(73) Assignee: Thomson CSF Detexis, Saint Cloud (FR)

( * ) Notice: Subject to any disclaimer, the term of this patent is extended or adjusted under 35 U.S.C. 154(b) by 0 days.

(21) Appl. No.: 09/405,234

(22) Filed: Sep. 24, 1999

(30) Foreign Application Priority Data

Sep. 24, 1998 (FR) .................................................. 98 11938

(51) Int. Cl.[7] .............................. G06F 7/00; G08B 21/00
(52) U.S. Cl. .......................... 701/16; 73/178 T; 340/945
(58) Field of Search .................................. 701/1, 3–5, 8, 701/9, 14, 16, 300, 301, 302; 73/178 R, 178 T; 340/945, 948, 951, 961, 970–972, 974; 244/114 R, 183–186

(56) References Cited

U.S. PATENT DOCUMENTS

| 4,567,483 | * | 1/1986 | Bateman et al. ...................... 340/970 |
| 5,377,937 | * | 1/1995 | La May et al. ...................... 244/185 |
| 5,420,582 | * | 5/1995 | Kubbat et al. ...................... 340/974 |
| 5,428,354 | * | 6/1995 | Torget ................................. 340/963 |
| 5,798,712 | * | 8/1998 | Coquin ................................ 340/970 |

FOREIGN PATENT DOCUMENTS

| 0 565 399 | 10/1993 | (EP) . |
| 0 802 469 | 10/1997 | (EP) . |
| 2 717 934 | 9/1995 | (FR) . |
| 2 783 374 | 6/1996 | (FR) . |

* cited by examiner

Primary Examiner—William A. Cuchlinski, Jr.
Assistant Examiner—Edward Pipala
(74) Attorney, Agent, or Firm—Nixon & Vanderhye P.C.

(57) ABSTRACT

A landing aid device comprises processing means, which receive aircraft path data, and data regarding the position of at least one runway towards which the aircraft is steering. These processing means comprise calculation means which supply a state signal, comprising at least one condition which is dependent on the path data and on the runway data, this function being chosen so as to express the fact that the path of the aircraft converges towards the runway.

19 Claims, 8 Drawing Sheets

LANDING AID DEVICE, ESPECIALLY FOR ANTI-GROUND-COLLISION ALERT VETOING

FIELD OF THE INVENTION

The invention relates to the landing of aeroplanes.

Aircraft are now furnished with anti-ground-collision alerting devices. However, landing is a form of gentle collision with the ground. Therefore, onwards of a certain moment in the landing approach, the alerting device will continually generate an untimely alert. It is desirable for this alert to be selectively vetoed, so as not to needlessly hinder the pilot, whose attention is especially demanded during landing.

PRIOR ART

A known solution consists in vetoing the alert when the height of the aircraft from the ground remains below a given threshold.

This solution is not entirely satisfactory. Specifically, if the threshold is fixed fairly low, the pilot is needlessly inconvenienced by an alert. If the threshold is fixed fairly high, the hindrance due to the untimely alert is diminished; on the other hand, the benefit of the anti-ground-collision alerting device is lost at a moment when its indications may be valuable, most particularly when the anti-ground-collision alerting device involved is of high performance.

A landing aid device comprising processing means, which receive on the one hand aircraft path data, and on the other hand data regarding the position of at least one runway, may be regarded as known.

OBJECTS OF THE INVENTION

It is a principal object of the invention to provide means to effect a veto whose qualities are connected with those of the anti-ground-collision alert itself, so as to avoid undesirable alert conditions during supposedly normal landing approaches.

Having posed and analysed this problem, the Applicants have sought to define automatically one or more conditions indicating that a landing approach is normal.

SUMMARY OF THE INVENTION

According to the invention, the processing means comprise calculation means able to supply a state signal, comprising at least one condition which is a function of the path data and on the runway data, this function being chosen so as to express the fact that the path of the aircraft converges towards the runway.

Preferably the calculation means are organized so as to define a volume which possesses a chosen outline, positioned in a chosen manner with respect to the said runway, which is advantageously defined by a representation stored in memory. In addition, the state signal comprises a so-called static condition, pertaining to the belonging of the current position of the aircraft to this volume.

More preferably the state signal furthermore comprises a so-called dynamic condition, pertaining to the convergence of a predicted path of the aircraft towards the said runway, according to a chosen criterion.

According to other aspects of the invention, which will be described hereinafter in detail, within the static condition there is distinguished a horizontal static subcondition and a vertical static subcondition, and, preferably, within the dynamic condition there is distinguished a horizontal dynamic subcondition and a vertical dynamic subcondition.

A very important application of the invention is the vetoing of some at least of the alerts generated by an anti-ground-collision alerting device for an aircraft, during the landing approach. The invention applies most particularly in the precise case where the alert-generator means are based on comparing positions situated on at least one predicted path of the aircraft with a stored representation of the said terrain, in which case the stored representation of the runway is referred to the same co-ordinate system as the stored representation of the terrain which serves for the alert-generator means.

BRIEF DESCRIPTION OF THE DRAWINGS

Other objects and advantages of the invention will become apparent on examining the detailed description below, as well as the appended drawings in which.

DETAILED DESCRIPTION OF THE PREFERRED EMBODIMENT

The appended drawings comprise numerous elements which, in essence, are of definite character. Accordingly, they will be able not only to serve to better elucidate the invention, but also to contribute to the definition thereof, as the case may be. The same holds for the relations collated, in an appendix of formulae, at the end of the description.

Furthermore, and in view of the technical nature of the subject, the descriptive contents of U.S. Pat. No. 5,488,563 and U.S. application Ser. No. 843,288 filed Apr. 14, 1997 are to be regarded as incorporated fully into the present description by way of reference. The disclosure of U.S. Pat. No. 6,088,654 is also incorporated herein by reference.

Use will also be made of units which do not belong to the MKSA system, in so far as they are employed in civil aeronautics.

Figure 1:
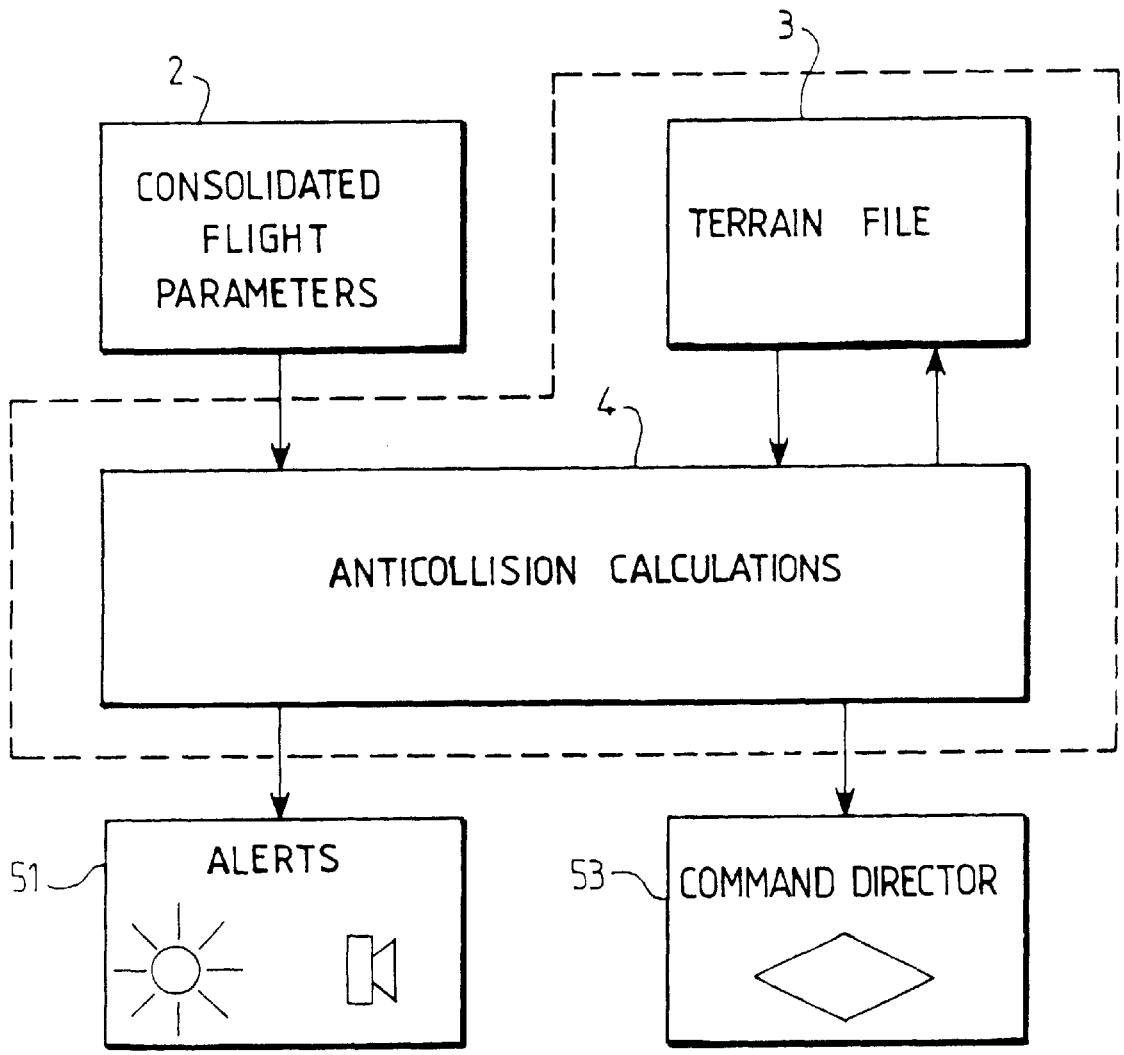
FIG. 1 is a very general basic diagram of an aerial navigation aid device, of GCAS type, such as those described in U.S. Pat. No. 5,488,563 and FR-96 04678 (now U.S. Pat. No. 2,747,492)

Reference will firstly be made to FIG. 1.

The device described in EP-A-0 565 399 is essentially intended to be installed on board an aircraft. The latter comprises equipment 2 capable of supplying, in the form of electrical signals, indications of flight parameters (position and "dynamics", in particular), such as an inertial or baro-inertial rig, and/or a radionavigation instrument, such as a GPS receiver, a radio-altimeter, or other airborne navigation sensors.

The inertial rig supplies the components of the speed (V) and acceleration vectors of the aircraft. From this it is possible to deduce all or some of the associated characteristic angles (attack, sideslip, slope, pitch, heading, list, in particular), or directly to gather the values of these angles used internally by the inertial rig. These angular values may be displayed and/or used at the flight deck. For the altitude, the inertial rig co-operates with a barometric altimeter (not represented), in a known manner.

The GPS receiver supplies raw measurements of latitude L1, longitude G1 and altitude Z1, refreshed at a rate p1 of a few seconds to a few minutes. By integration over the speed and acceleration vectors, the inertial rig supplies other measurements of latitude L2, longitude G2 and altitude Z2, which are accurate but drift over time. These magnitudes are mutually validated, according to known validation techniques. The validated measurements L2, G2, Z2 are available at the rate p1. However, they are refined on the basis of the inertial rig at a rate p2 of around one second.

All of this is dubbed the "consolidated flight parameters" and is supplied by the unit 2.

The following notation is defined:

Z is the height of the aircraft above the ground, emanating for example from a radio-altimeter and/or from the barometric altitude, minus the level of the ground;

x and y are the horizontal co-ordinates of the aircraft in a reference frame fixed with respect to the ground. For simplicity, the x axis is taken here as the axis of the relevant runway.

A unit 3 contains a terrain file, established in a manner described in the prior patents. Depending on the longitude and latitude quantities, a part of this file, the so-called local map, is accessed, this being a three-dimensional representation of the relief of the region overflown by the aeroplane. On the basis of this local map and of the position quantities of the aircraft, the unit 4 performs anti-collision calculations which may be accompanied by terrain avoidance calculations.

In the presence of a risk of collision, an alert (51) is issued. A command director 53 can suggest an avoidance manoeuvre. This is destined for the flight deck (or control deck). The local map can also be used for generating a synthetic image, with its display device.

All of this is described in the aforesaid patents, which also indicate how to cross-check and verify the various items of information available, especially verticalwise.

One of the basic essentials of EP-A-0 565 399 is the fact that Applicants have perceived the possibility of storing on board an aeroplane a terrain file for representing almost the entire terrestrial globe, within the outline and resolution limits suitable for the requirements of an aeroplane. Thus, Applicants have proposed an anti-ground-collision alerting device for an aeroplane of a novel kind, which uses an on-board database, of worldwide scope, and containing data of the "altitude of the terrain" type.

This innovation is of such a nature as to increase the safety of aerial navigation. It can in particular substantially reduce the false alert rate encountered with the prior anti-collision alerting systems. The harmful influence of a high false alert rate is readily understood: the more often the alerting system is mistaken, the less attentive the pilot is to it.

Applicants have sought to effect a vetoing whose qualities are connected with those of the anti-ground-collision alert itself, in particular that defined hereinabove, so as to avoid undesirable alerts during supposedly normal landings, that is to say problem-free ones.

Figure 2:
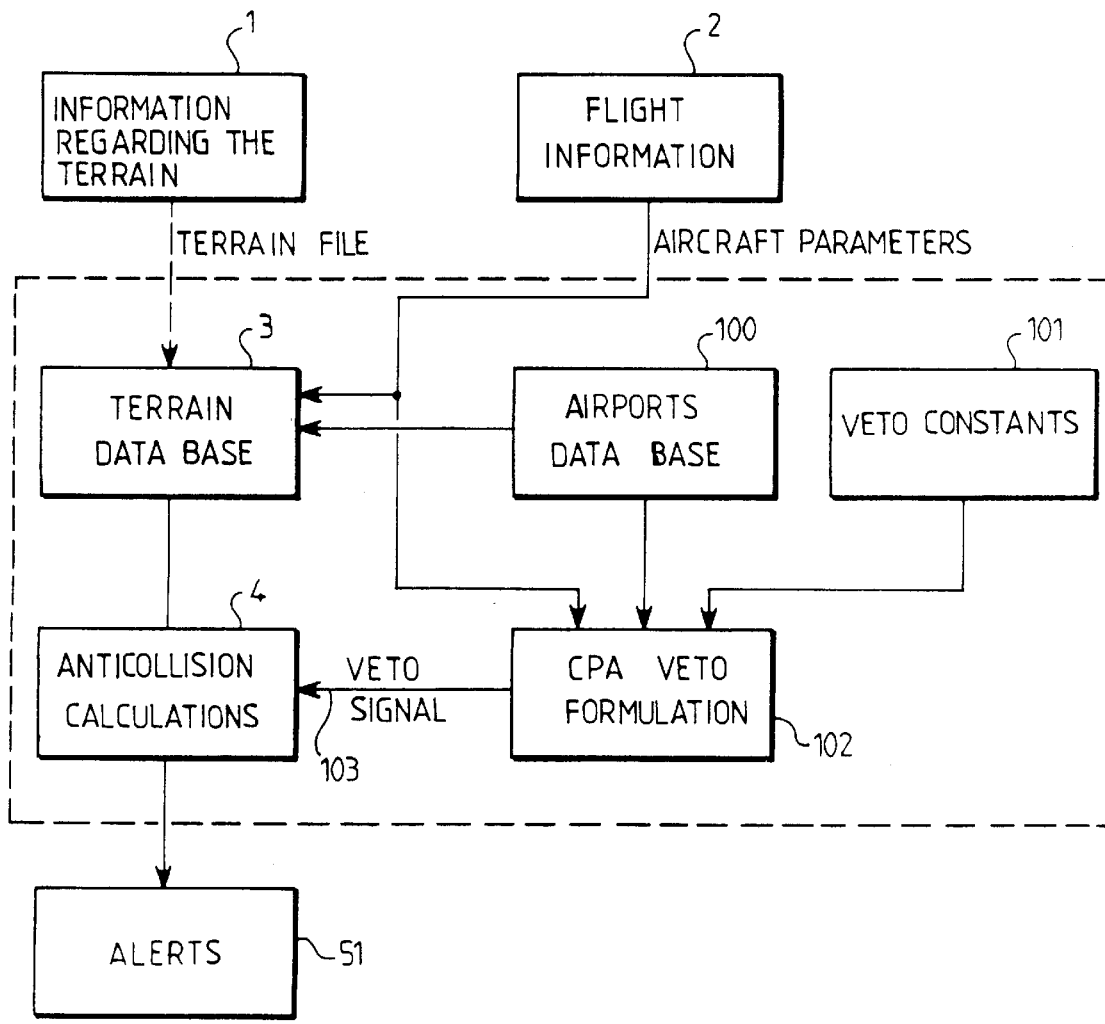
FIG. 2 is a more detailed diagram of an exemplary embodiment of a device according to the invention.

In FIG. 2, the unit 3 represents a "terrain database" file defined on the basis of information regarding the terrain, which is loaded for example on the ground (unit 1). Appended thereto is an "airport database" file 100, which contains data defining the identification and the exact position of each of the runways of the airport, with the desired accuracy. Very advantageously, appended thereto is the standard landing and/or approach slope at each end of some at least of the runways.

In this regard, the word "runway" denotes a rectangular area kitted out to serve over its length for the movements of aeroplanes. As a general rule, landing may be effected along the runway in either direction. When the context so demands, we shall speak of an "oriented runway" so as to define a runway when considered taken in a given landing direction. The "threshold" of the runway is the start of its pavement. Usually, a runway (oriented) includes a "displaced threshold", marked on its pavement.

An oriented runway can be defined by the heading of its axis, and the co-ordinates (longitude, latitude and altitude of its threshold). The words "upstream" and "downstream" refer to the direction of landing, both for the oriented runway and for the landing approach.

As in FIG. 1, on the basis of information or flight parameters 2 and of the "terrain database" 3, the unit 4 carries out the anti-collision calculations which allow it to actuate one or more alerts 51, as the case may be. These alerts are customarily dubbed "caution" and "warning".

A unit 102 formulates the command (state) for vetoing the unit 4. More generally, vetoing is applicable to any Collision Prediction and Alerting function ("CPA").

For this purpose, the unit 102 receives (FIG. 3, at the top) on the one hand the flight information from the unit 2 and on the other hand the information output by the airport database 100, as well as information forming "veto constants", stored in memory at 101.

The unit 102 comprises a unit 210, which carries out calculation and/or logic operations so as to supply working quantities to 5 outputs, in the embodiment illustrated, namely:

an output 210-1, going to a unit 220, which, on the basis of the working quantities which it receives, formulates a first condition CnC (aircraft configuration subcondition) relating to the current aircraft configuration, an output 210-2, going to a unit 231, which supplies a second condition CnAHS (horizontal static subcondition), which is a condition relating to the approach, considered in the horizontal plane and statically (position of the aircraft), an output 210-3, going to a unit 232, which supplies a third condition CnAVS (vertical static subcondition), which is a verticalwise static approach condition, an output 210-4, going to a unit 241, which supplies a fourth condition CnAHD (horizontal dynamic subcondition), which is an approach condition considered in the horizontal plane and dynamically, and an output 210-5, going to a unit 242, which supplies a fifth condition CnAVD (vertical dynamic subcondition), which is a verticalwise dynamic approach condition.

To lighten the account, the subconditions will hereinafter be referred to simply as "conditions".

The unit 250 supplies a general static condition CnAS, by a logical AND on the horizontal static conditions CnASH and the vertical static condition CnASV (relation I). Likewise, the unit 260 supplies a general dynamic condition CnAD, by a logical AND on the horizontal dynamic condition CnADH and the vertical dynamic condition CnADV (relation II).

The unit 290 carries out a logical AND of the three conditions CnC, CNAS and CnAD, so as to define an overall veto condition CnG (relation III). As an option (lighter line in the drawing), the facility 295 carries out an additional processing, as will be seen hereinafter.

The output from the unit 290 is equivalent to formulating an overall approach condition CnA by a logical AND of the general static condition CnAS and of the general dynamic condition CnAD (relation IV), then to defining the global veto condition CnG by a logical AND of the conditions CnC and CnA (relation V).

The overall approach condition CnA may also be regarded as being a logical AND on the four approach subconditions (relation VI), or else as being a logical AND (relation VII) on a horizontal approach condition CnAH and a vertical approach condition CnAV, themselves defined by relations VIII.

These two different presentations make it possible to undertake:
on the one hand, an "aircraft analysis", distinguishing that which appertains to the position of the aircraft (FIGS. 5 and 8), or else to its path prediction (FIGS. 7 and 9),
on the other hand, a "ground analysis", distinguishing the "vertical plane" (projection of the path of the aircraft in a vertical plane) from the horizontal plane (projection of the path of the aircraft in a horizontal plane).

Figure 3:
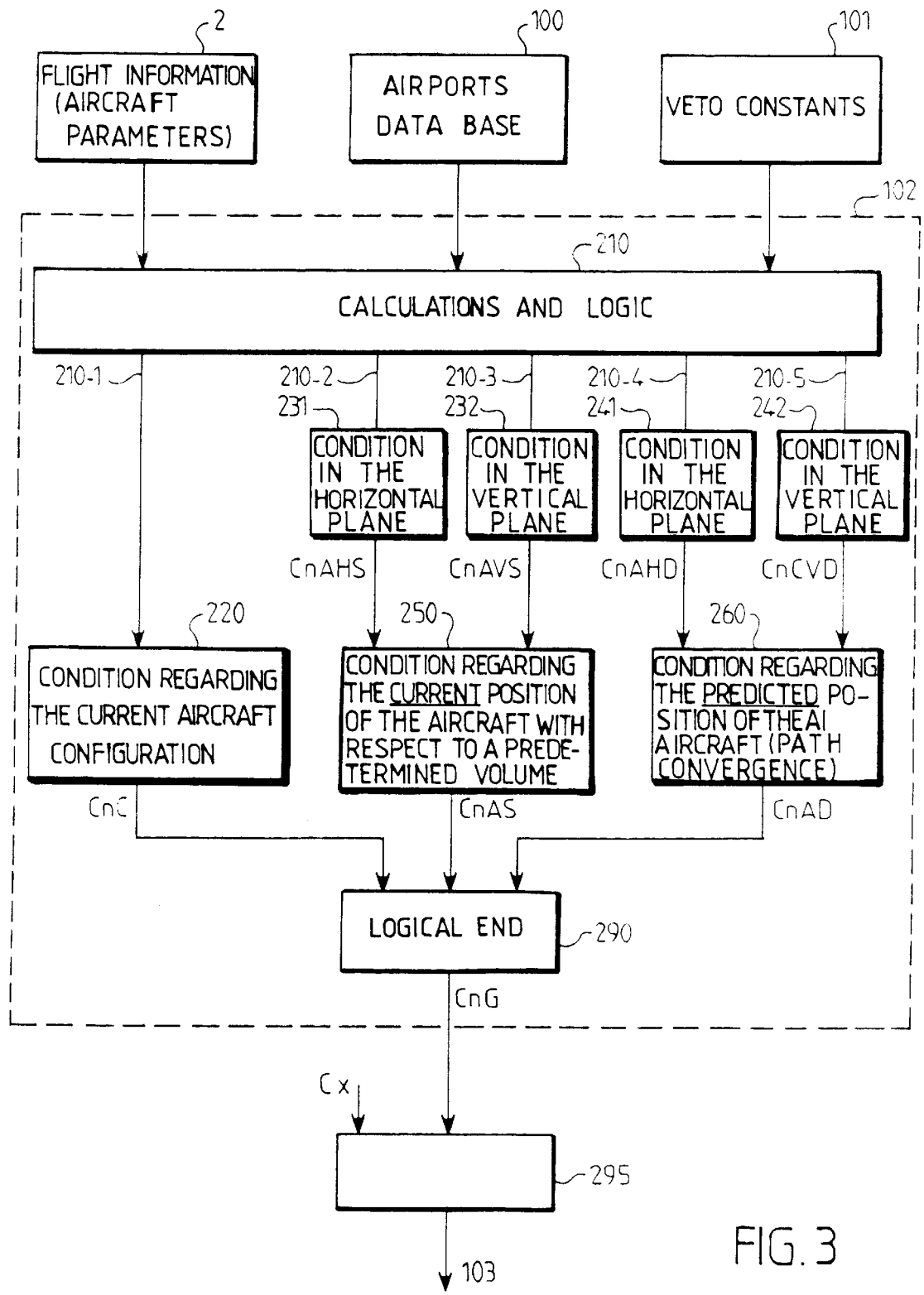
FIG. 3 is a still more detailed diagram of the vetoing device according to the invention.

Moreover, the splitting up of FIG. 3 into units is of a functional nature. In practice, all or some of the operations appearing inside the box 102 could be carried out by the same processing and calculation unit, which works repetitively. The latter must be able to undertake calculations of a geometrical and trigonometrical kind, as well as to process the logical conditions. For this purpose, use is made, for example, of a microcomputer of the POWER PC 603 type, together with programs written, for example, in the C language of the C.ANSI type, if appropriate with the assistance of a DSP type supporting processor.

The genesis of each of the conditions will now be described.

The aircraft configuration condition CnC indicates that the aircraft is ready to land hardwarewise. According to the current standards, it can, for example, comprise, as a logical AND (relation X):
a condition CnC1 pertaining to the lowering of the landing gear ("gear down"), and
a condition CnC2 indicating that the wing flaps are deployed ("full flaps"), preferably as a logical OR with a state CnC3, permitting the condition CnC2 to be overridden, for example on request by the pilot ("flaps override").

Figure 4:
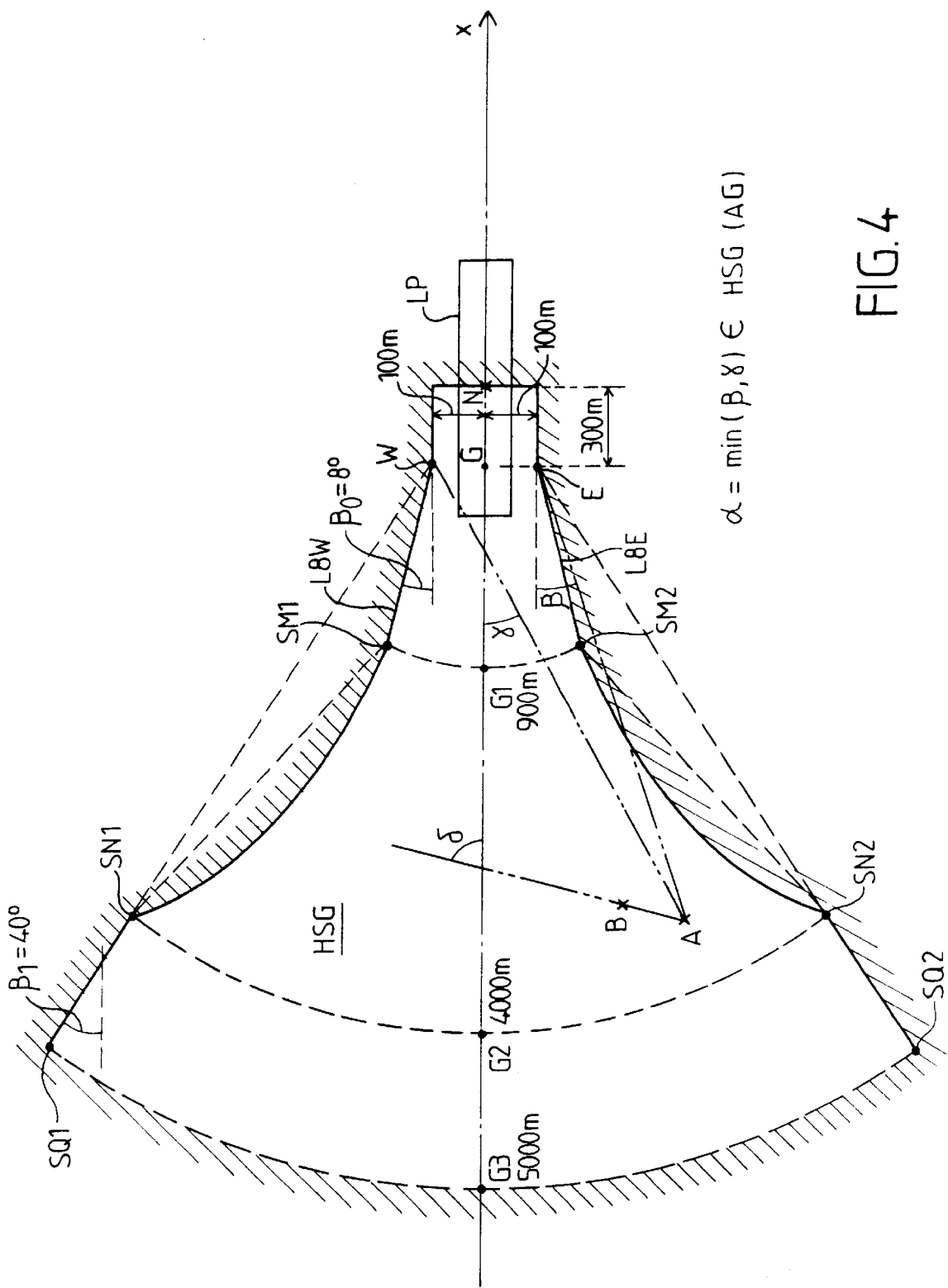
FIG. 4 is a diagrammatic view from above of a runway, illustrating a horizontalwise vetoing sector.

According to the invention, the horizontal static condition CnASH is defined with the aid of a horizontal approach sector SHA, a preferred example of which is given in FIG. 4.

The information regarding the planned oriented runway must be made accessible to the vetoing device. It is known that a runway is generally horizontal, or nearly so. Hence, the plane of the runway (as the case may be, the midplane of the runway) will here be referred to as the horizontal plane.

Automatic determination of the relevant oriented runway can be achieved on the basis of one and/or other of the following two criteria, applied below a distance threshold equal for example to 5000 meters (distance G-G3):
we take the stored runway whose axis is closest to the horizontal projection of the instantaneous speed vector, or of a representation, for example by averaging, of the latter vector,
we take the oriented runway whose runway threshold is closest to the aircraft in terms of horizontal projection.
As a variant, in an aircraft equipped with a flight management system (FMS), in this system we take the information regarding the planned oriented runway. Another variant consists in the pilot indicating this runway to the on-board electronics of the aeroplane, since, when he is preparing to land, the pilot always receives verbally the designation of his planned oriented runway.

Thereafter, the device according to the invention can, in the memory 100, isolate the co-ordinates of the relevant runway. Thus, the co-ordinates and the shape of this runway are those illustrated as LP in FIG. 4.

G denotes a reference point of the runway for defining the horizontal approach sector SHA. It is desirable for this point G to correspond to the grounding point of the landing path. In the embodiment described, by way of example, this point G is, in order of priority:
the so-called "glideslope position" sighted point extracted from the memory 100, if this point exists, and
the displaced threshold point extracted from the unit 100, if this point exists,
a point displaced 300 meters in the direction of landing, based on the runway threshold extracted from the unit 100.

Based on this point G, two points W and E are then defined as follows (in the embodiment described):
the length of the segment WE equals 200 m (lateral positional tolerance),
the segment WE is perpendicular to the axis of the runway, the point G is the middle of the segment WE.

A point N is furthermore defined as follows:
the point N is on the axis of the runway, 300 m downstream of the point G (the direction of landing of the aircraft).

The person skilled in the art will understand that these points may be determined with the aid of simple mathematical processings.

In FIG. 4, to the right of the segment WE, the approach sector comprises a rectangular zone of length WE, which goes as far as the point N.

The shape of the approach sector leftward of the segment WE will now be defined, according to the horizontal projection of FIG. 4.

The aircraft is at the point A. $\beta$ and $\gamma$ respectively denote the angles which the segments AE and AW make with the axis GN of the runway (or any parallel thereto). $\alpha$ denotes the smaller of the two angles $\beta$ and $\gamma$. $D_h$ denotes the projection of AG on the horizontal plane passing through G.

Figure 5:
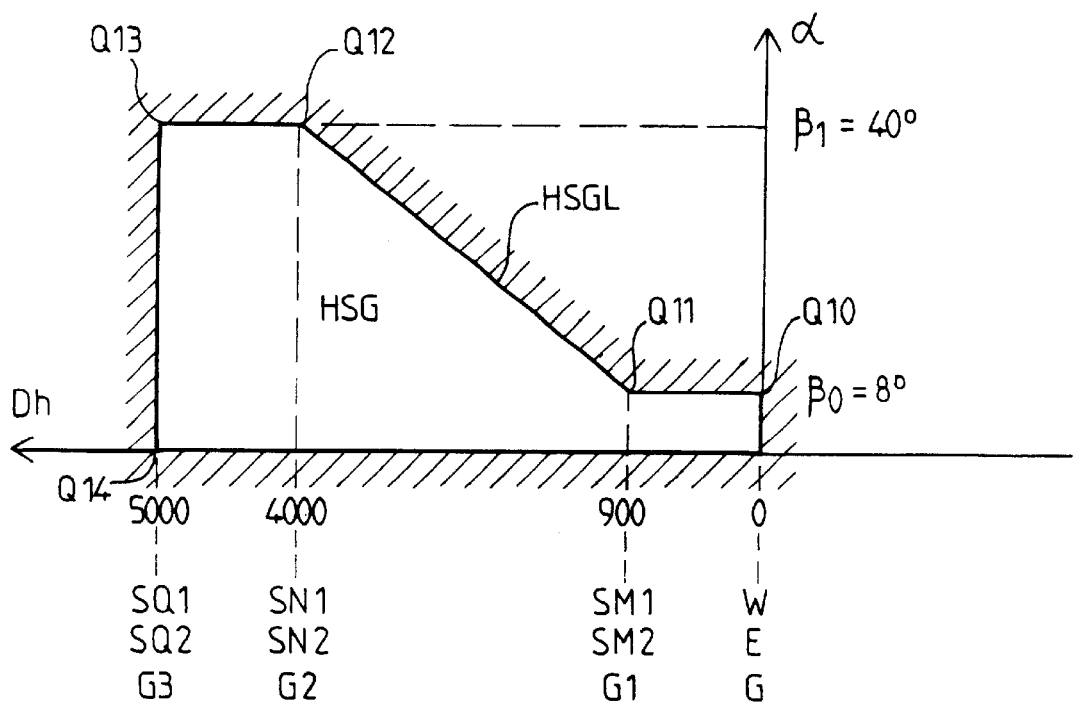
FIGS. 5, 6A and 7 are graphs relating to horizontalwise vetoing.

FIG. 5 is a graph having the horizontal distance $D_h$ as abscissa and the angle $\alpha$ as ordinate. In order to correspond to the conditions of a landing (and to FIG. 4), the abscissae are decreasing from left to right.

An outline HSGL is defined by the points Q10 to Q14, and the origin O. The interior of this outline is a closed domain HSG (the outside is distinguished by short hatching).

The condition CnAHS is true if the angle $\alpha$ belongs to the domain HSG of FIG. 5. The interval of the values of $\alpha$ situated in the domain HSG is a function of the horizontal distance $D_h$. This is expressed by relations XI.

The shape of the horizontal approach sector SHA stems from that of this domain or template HSG. It is described hereinbelow in the direction reverse to that of landing.

The outline HSGL of FIG. 5 includes a horizontal plateau Q10–Q11, of from 0 to 900 meters. This defines the following parts of the outline of the approach sector (FIG. 4):
To the left of the point W, a segment W-SM1, which stands on a line L8W, which diverges upwards by an angle $\beta_0$, equal to 8° here, with respect to the runway axis GN.
To the left of the point E, a segment E-SM2, which stands on a line L8E, which diverges downwards by an angle $\beta_0$, also equal to 8° here, with respect to the runway axis GN.

On the runway axis, a segment G-G1.

To facilitate understanding, these three sets of points (at the top, at the bottom and on the axis) are recalled under the corresponding limits of the template of FIG. 5.

Next, the outline HSGL of FIG. 5 possesses an increasing zone Q11–Q12 (here linear), for the values of α which go from $\beta_0=8°$ to $\beta_1=40°$. The following parts of the outline of the approach sector correspond to this (FIG. 4):

curvilinear top segment SM1-SN1, whose concavity faces upwards, curvilinear bottom segment SM2-SN2, whose concavity faces downwards, on the runway axis, a segment G1-G2.

It will be noted that the average inclination of the curvilinear segments SM1-SN1 and SM2-SN2 is greater than $\beta_0=8°$.

Finally, the outline HSGL of FIG. 5 possesses another plateau Q12–Q13, for $\beta_1=40°$, and the abscissae from 4000 to 5000 meters. In the approach sector (FIG. 4) this corresponds to:

at the top, a segment SN1-SQ1, which diverges at the angle $\beta_1$ with respect to a parallel to the runway axis, at the bottom, a segment SN2-SQ2, which diverges at the angle $\beta_1$ with respect to a parallel to the runway axis, but downwards, on the runway axis, a segment G2-G3.

The outline HSGL is noteworthy through its intermediate part which decreases with the reduction of the distance $D_h$ from the aircraft to the chosen point G. It should be noted that the second plateau is optional; the template can terminate on its decreasing zone Q11–Q12.

Moreover, the approach sector SHA as described is symmetric with respect to the runway axis. It is conceivable for it to be made asymmetric, at least for certain airports, by modifying or displacing the template on one side, and/or by placing the points W and E asymmetrically with respect to G.

The plateaux and the rectilinear climb of FIG. 5 correspond to conditions which are simple to calculate. Additionally, this results in the approach sector having geometrically simple outlines, which are straight for the most part. The person skilled in the art will understand that it is possible to produce more complex equivalent outlines, while increasing the calculation power, if appropriate.

The horizontal approach sector makes it possible to verify that, in the horizontal plane, the successive positions of the aircraft converge towards the runway.

Thus, the condition CnAHS can be defined on the basis of the following parameters:

position A of the aircraft, direction of the runway axis and point G,

"constants" defining the template of FIG. 5, for example by its four points of transition Q10 to Q13, or else in the form of a table $HSG(D_h)$, sampled with a sufficiently fine spacing over the distance $D_h$.

Thereafter, it is necessary to calculate the positions of the points W and E, the distance $D_h$, and the angle α, derived from β and γ. These calculated quantities are obtained in the unit 210, which transmits the values $D_h$ and α to the unit 231 together with the constants defining the template of FIG. 5, or better still the ordinate value of the template for the current value of $D_h$.

As regards the leftward limit of the approach sector, this is defined by the outline SQ1-G3-SQ2. This corresponds to the fact that the distance $D_h$ of the aircraft from the point G must be less than a given threshold value, here fixed at 5000 m.

It is therefore apparent that to the left of the segment WE, the horizontal approach sector SHA is entirely defined by the template HSG of FIG. 5. As a variant, the sector SHA could be parametrized directly as a function of $D_h$.

We now deal with the dynamic horizontal approach condition, denoted CnAHD. This condition is, in the preferred embodiment described, slightly more complex than the previous one.

Specifically, account is now taken, not only of the current position A of the aircraft, but also of a prediction of its future path in the horizontal plane. This prediction is defined in this instance by a point B, on the basis of a vector AB, such that:

the length or norm of the vector AB is equal to the horizontal speed (or ground speed) of the aircraft, and the sense or direction DIR of the vector AB is equal to the track angle of the aircraft.

The angle between the vector AB and the oriented runway axis is then denoted δ (FIG. 4).

Figure 6:
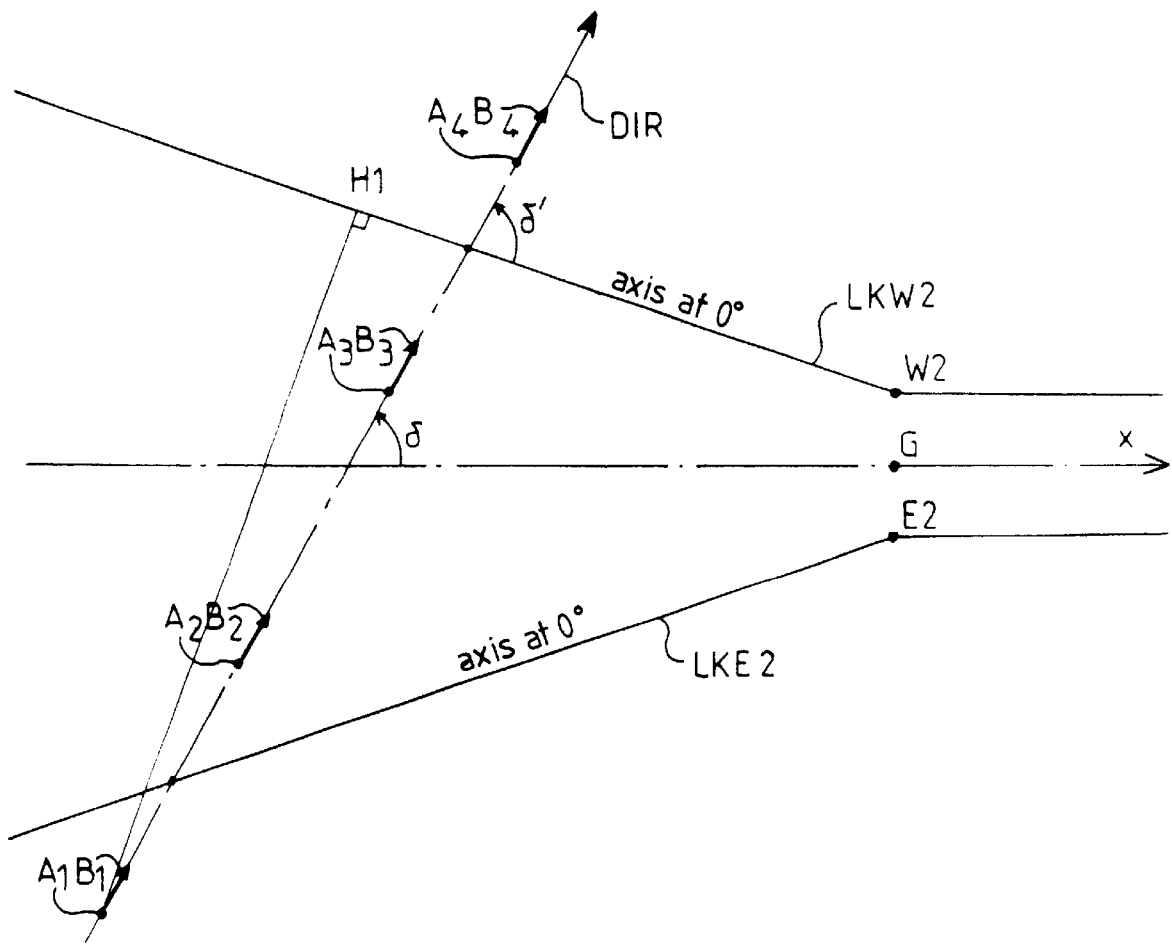
FIG. 6 is a drawing illustrating various particular situations of the horizontal convergence towards the landing axis.

Moreover, a convergence sector is defined in a manner which can be partly likened to the defining of the horizontal approach sector. In FIG. 6, two points W2 and E2 are defined (as were W and E) on either side of G, perpendicularly to the runway axis. LKW2 denotes a boundary comprising a half-line departing leftwards from W2 and diverging from the runway axis by an angle θ, here equal to 8°, extended as required to the right of W2 by a parallel to the runway axis. Likewise, LKE2 denotes a half-line departing leftwards from E2 and diverging from the runway axis by an angle θ, extended as required to the right of W2 by a parallel to the runway axis. The convergence sector is the zone lying between LKW2 and LKE2. Preferably, according to the embodiment described, we have E2=E, W2=W, and $\theta=\beta_0$.

Dkw denotes the distance between A and the half-line LKW2, and Dke the distance between A and the half-line LKE2.

It is firstly assumed that δ is between 0° and 180° (the case of FIG. 6). If A is beyond the half-line LKW2 (the case $A_4B_4$), then any vetoing is prohibited, for example by forcing Dkw to an impossible value, such as −1. It is thus supposed that, in this case, the aircraft is incapable of landing correctly.

Symmetrically, it is now assumed that δ is between 180° and 360° (in FIG. 6, the direction DIR would be replaced by its symmetric inverse with respect to the oriented runway axis). If A is shy (below in the figure) of the half-line LKE2, then any vetoing is prohibited, for example by forcing Dke to an impossible value, such as −1.

The other cases will now be dealt with.

Figure 6A:
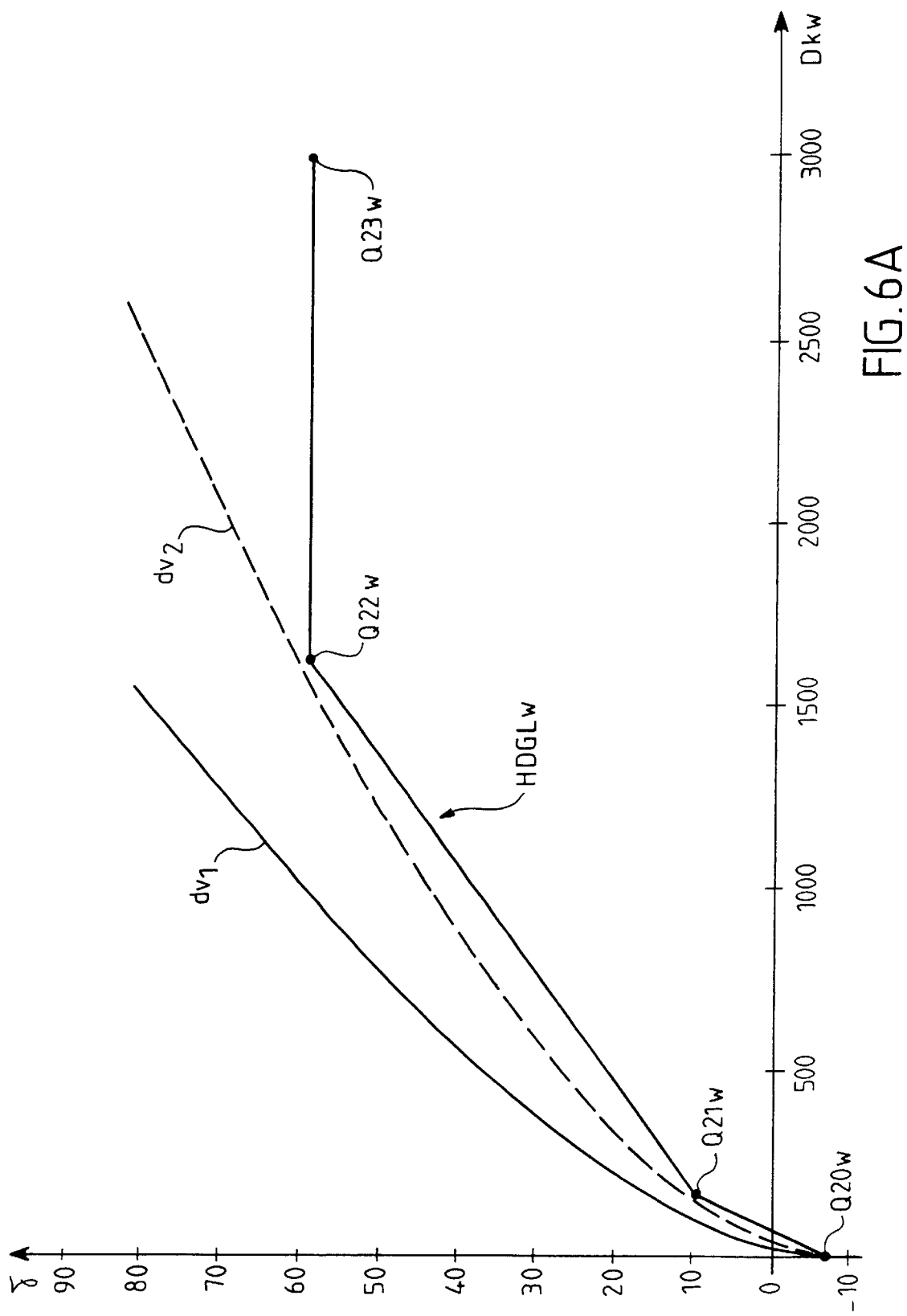

Consider for example the half-line LKW2. Assume that the aircraft is steering towards it from the bottom of FIG. 6. Applicants have observed that it is possible to define, as a function of the angle δ (in practice, of δ+θ), a distance Dkw to be complied with, if one wishes to be certain that the aircraft can turn towards the runway while remaining below the half-line LKW2. This distance advantageously makes allowance for the time taken by the aircraft to bank before turning. This yields for example (FIG. 6A) the curve $dv_1$ (solid line) for a horizontal aircraft speed of around 70 m/s, and the curve $dv_2$ (broken line) for a horizontal aircraft speed of around 90 m/s. The curves $dv_1$ and $dv_2$ have the form of an ArcSine function.

Although it is conceivable to use these curves themselves, Applicants have observed that the stricter limit, here $dv_2$, can be approximated by three straight segments, Q20w–Q21w, Q21w–Q22w, and Q22w–Q23w, together forming the boundary HDGLw, situated below $dv_2$, hence still stricter.

It is then sufficient to calculate Dkw and to verify that it lies below the curve HDGLw, as a function of δ. The same is done, symmetrically, for Dke and a curve HDGLe. Vetoing is possible if both conditions are satisfied.

Applicants have also observed that it is possible to further simplify the calculations, by considering just a single distance, denoted Dhd. The foregoing elements are modified as follows:

if δ is between 0° and 180° (the case of FIG. 6), and so long as A remains shy (below in the figure) of the half-line LKW2 (the case $A_1B_1, A_2B_2, A_3B_3$), Dhd is taken equal to the distance Dkw between A and the half-line LKW2;

if δ is between 180° and 360° (in FIG. 6, the direction DIR would be replaced by its symmetric inverse with respect to the oriented runway axis), and so long as A remains beyond (above in the figure) the half-line LKE2, Dhd is taken equal to the distance Dke between A and the half-line LKE2.

As indicated by relation XII, the dynamic horizontal approach condition CnADH is then defined by the fact that the angle δ belongs to the domain or template HDG (FIG. 7), which is itself dependent on the distance or "turning margin" Dhd, along the abscissa. HDGL denotes the outline of this domain.

Figure 7:
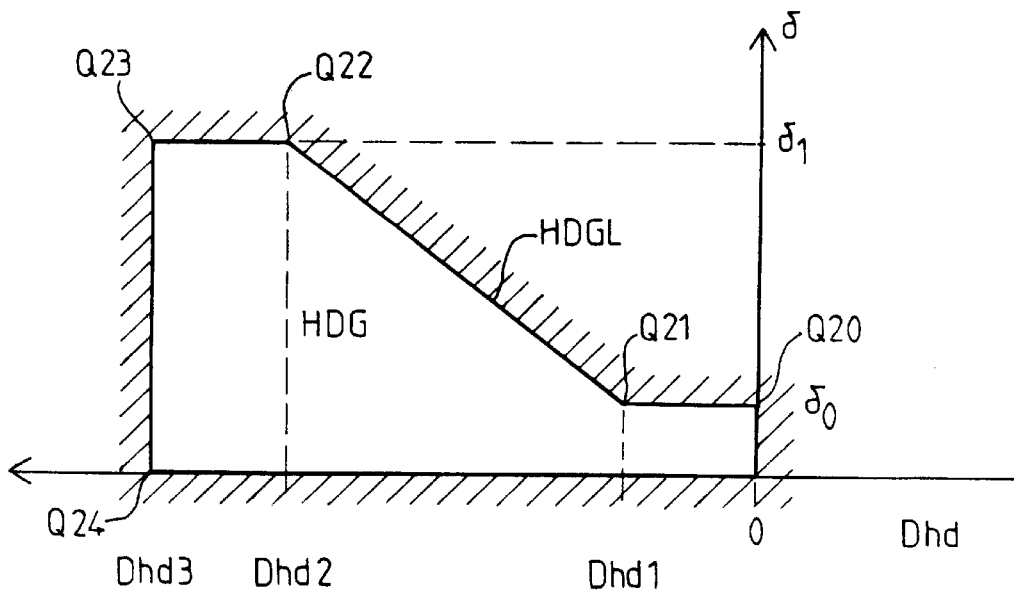

FIG. 7 is, like FIG. 5, established with abscissae which decrease from left to right. For Dhd going from 0 to Dhd1, the curve includes a plateau Q20–Q21, of level $δ_0$ of close to 0°. From Dhd1 to Dhd2, the outline HDGL comprises a segment Q21–Q22, here rectilinear, which increases with Dhd. From Q22 to Q23 there is another plateau of level $δ1=60°$, for Dhd going from Dhd2 to a limit value Dhd3= 4000 meters for example. The outline HDG is closed by the vertical Q23–Q24, the abscissa axis, and the vertical between the origin and Q20.

In practice, and especially according to the characteristics of the aircraft, it will be possible to take Dhd1=75 to 150 meters, Dhd2=900 to 2000 meters, and the maximum Dhd3= 4000 meters for example.

Thus, the convergence of the planned path towards the runway axis is predicted with a tolerance either side of this axis. The "rigorousness" of the convergence demanded increases as the aircraft approaches the runway. More precisely, the dynamic horizontal approach condition CnAHD makes it possible to verify that, in the horizontal plane, the component of the speed of the aircraft which is transverse to the runway axis remains compatible with a return in time to the runway axis (centre line).

Providing, instead of the theoretical curves on both sides, a single template HDGL in accordance with FIG. 7, with a plateau at small distances, from Q20 to Q21, amounts to authorizing a permitted veto "corridor", of width Dhd1, to the inside of the lines LKW2 and/or LKE2, for $0<δ<δ_0$. Specifically, if the aircraft is close for example to LKW2 on the inside (Dhd<Dhd1), vetoing is authorized, whereas δ>0 indicates that the aircraft is tending to leave the convergence sector; however, if the aircraft continues in the same direction, it will cross to the other side of LKW2, with Dhd=−1 which prevents vetoing. Vetoing therefore endures only if the aircraft remains in the corridor, or, better still, is approaching the runway axis.

The condition CnAHD can be defined on the basis of the following parameters:

as before, position A of the aircraft, direction of the runway axis and point G, direction of the vector AB, points W2 and E2, which, here, coincide with W and E, "constants" defining the template of FIG. 7, for example by its four points of transition Q20 to Q23, or else in the form of a table HVG(Dhd), sampled with a sufficiently fine spacing over the distance Dhd.

Most of these calculations can be likened to those already undertaken in respect of the horizontal approach sector: points W2 and E2, and half-lines LKW2 and LKE2. From this is derived, according to the pertinent case, the distance Dhd. On its part, the calculation of the angle δ is of the same nature as that of the angles β and γ. These calculated quantities are obtained in the unit 210, which transmits the values Dhd and δ to the unit 241 together with the constants defining the template of FIG. 7, or better still the ordinate value of the template for the current value of Dhd.

It will be noted that the horizontal dynamic condition CnADH described above takes account not only of dynamic data (speed), but also of position data. It will also be noted that the convergence sector, in the example described, coincides with the part SM1-W-E-SM2 of the horizontal approach sector which is close to the runway. The condition CNAHD therefore at least partially contains the condition CnAHS. It is therefore possible to define combinations of these two conditions other than the one proposed here.

Figure 8:
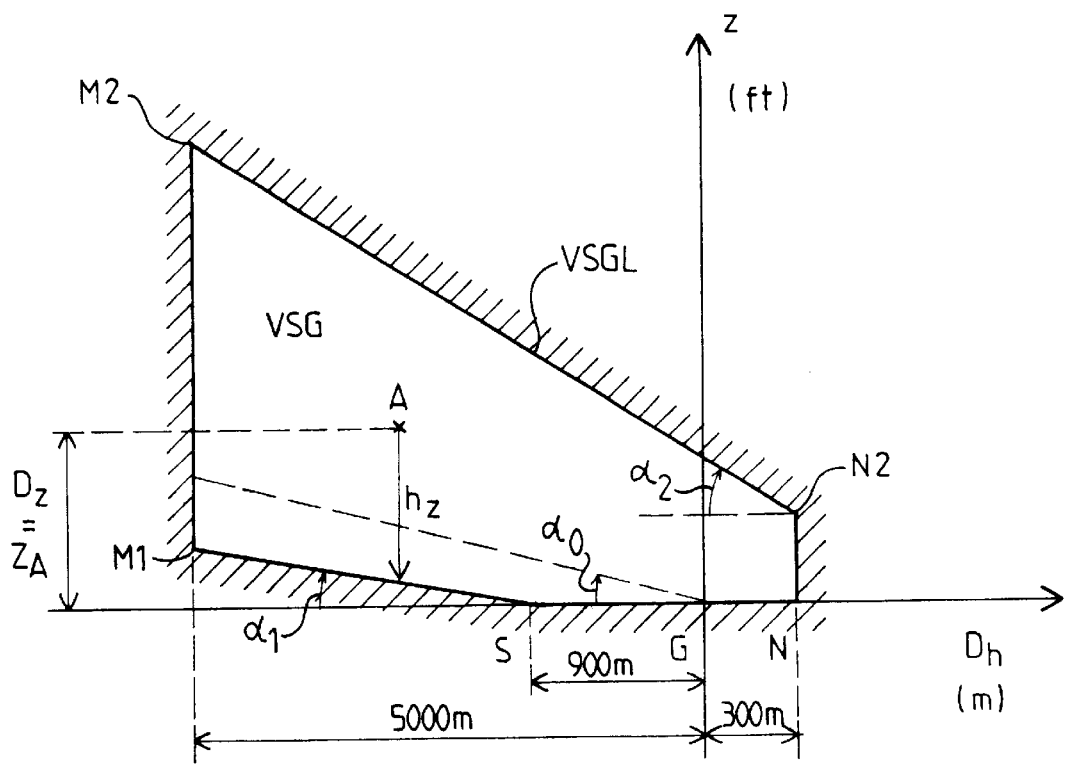
FIGS. 8 and 9 are two graphs relating to verticalwise vetoing.

Reference is now made to FIG. 8 in respect of the static vertical approach condition CnAVS.

A point S is defined, situated 900 m upstream of G in the direction of landing (FIG. 8). Furthermore, a point N2 is defined which is situated 50 feet (around 15 meters) vertically above N. This height of 50 feet is the tolerance in the vertical position error (for the veto).

Finally, three angles $α0$, $α1$, $≤α0$ and $α2≥α0$ are defined, with:

$α0$=standard landing slope angle for an oriented runway, taken by default equal to 3°, $α1$=minimum acceptable landing slope angle, here taken by default equal to the minimum acceptable alert-free angle for an approach on glideslope, i.e. $α1=2.5°$, $α2$=maximum acceptable landing slope angle, taken by default at 4.5°, or else at 8° if steep-angled approaches are possible for the relevant airport (information item stored in the airports database).

The approach sector in the vertical plane is then defined by the template of FIG. 8. Its outline VSGL is delimited:

by a segment S-N at ground level, passing through G, to the right, by the vertical N-N2, at the top, by the line N2-M2 which climbs leftward at the angle $α2$, at the bottom leftward, by a line which starts from the point S, at an angle $α1$, up to M1, vertically to the left, by a vertical line M1–M2 situated here 5000 m to the left of the point G.

The domain situated inside this outline is denoted VSG. It is itself the vertical approach sector. Its vertical extent is dependent on the distance $D_h$, which is the projection of AG onto the horizontal plane passing through G. The height of the aircraft above the horizontal plane passing through G is denoted $z_A$, with $Z_A=D_z$.

The condition CnAVS then corresponds to the fact that $z_A$ is situated inside the domain VSG, itself dependent on $D_h$, as indicated by relation XIII.

The vertical approach sector makes it possible to verify that, in the vertical plane, the successive positions of the aircraft converge towards the runway, without passing prematurely too near to the ground.

Thus, the condition CnAVS can be defined on the basis of the following parameters:

as before, position A of the aircraft, direction of the runway axis and point G, point S, "constants" defining the template of FIG. 8, for example in one of the ways used for the previous templates, or in any appropriate way.

The unit 210 transmits the values $D_h$ (component of AG in the horizontal plane) and $D_z$ (component of AG in the vertical plane) to the unit 232. It also transmits the definition of the template of FIG. 8, or better still the ordinate value of the template for the current value of $D_z$.

We now deal with the fifth condition CnAVD, which is a dynamic approach condition in the vertical plane. It is defined on the basis of the vertical approach sector.

In FIG. 8, $h_z$ denotes the vertical height (in feet, in accordance with aeronautical usage) between the point A and the bottom limit M1-S-N of the outline VSGL. $V_z$ denotes the vertical speed of the aircraft.

Figure 9:
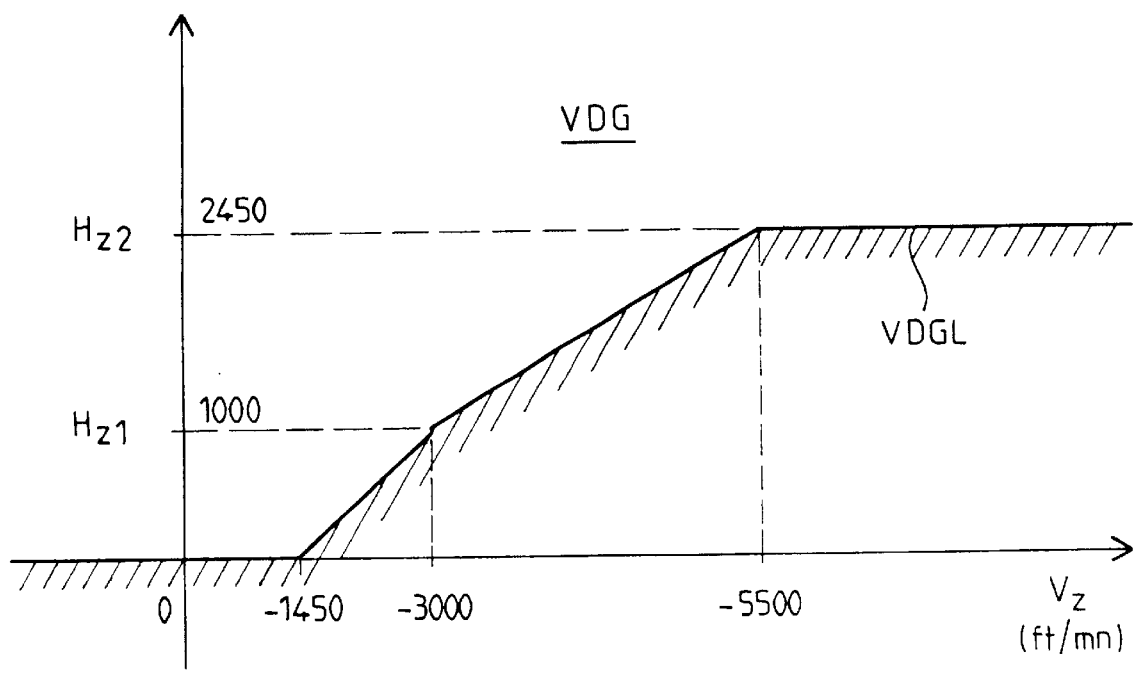

The template of FIG. 9 expresses a limit in terms of height $h_z$ in feet (ordinate), as a function of the vertical speed $V_z$ in feet per minute (abscissa). As the vertical speed of the aircraft is negative when the aircraft is approaching the ground, the abscissa axis is reversed.

The contour VDGL of the veto domain is established by the horizontal axis, starting from decreasing positive vertical speeds, down to around −1450 feet/minute. Thereafter, a first oblique segment climbs rightward up to the point $V_{Z1}=-3000$ feet/minute and $h_{Z1}=1000$ feet. A second vertical segment, slightly shallower, goes from the previous point up to the point $V_{Z2}=-5500$ feet/minute for $h_{Z2}=2450$ feet. The remainder of the outline is a horizontal plateau at 2450 feet. The outline VDGL has no limit other than a physical one (maximum speed of the aircraft) either to the right or to the left. If necessary, a limit can be fixed at 10,000 feet/min.

The domain VDG, for which a veto is possible, is the open domain situated above the broken-line outline VDGL.

The condition CnAVD is then defined by equation (XIV), expressing the fact that the vertical speed $V_z$ belongs to the domain VDG, which is itself dependent on $h_z$. (Unlike in the case of the previous templates, here the abscissa $V_z$ is expressed as a function of the ordinate $h_z$).

The requisite parameters are the same as for the condition CnAVD, plus the vertical speed $V_z$. The unit 210 transmits the values $h_z$ and $V_z$ to the unit 242 together with the definition of the template of FIG. 9. As a variant, the unit 210 transmits the value $D_z$ to the unit 242, and the unit 242 takes into account the oblique base segment M1-S, of inclination α1, so as to deduce $h_z$ therefrom.

The dynamic vertical approach condition CnAVD makes it possible to verify that, in the vertical plane, the speed of the aircraft decreases sufficiently as a function of height to allow the aircraft a landing at very low vertical speed, rather than a collision. It is therefore also a dynamic criterion of convergence of the path of the aircraft towards the runway.

As already indicated in respect of the condition CnAHD, the condition CnAVD can be modified so as to design a variant thereof which is a different function of vertical speed and of position in the vertical plane.

The embodiment described above corresponds to the case in which one wishes to automatically veto the anti-ground-collision alerting device which the aircraft comprises. It is particularly relevant in the case where the alert-generator means (2, 3, 4, 51) are based on a comparison (4) between positions situated on at least one predicted path of the aircraft and a stored representation of the said terrain, in particular because the stored representation (100) of the runway (LP) is referred to the same co-ordinate system as the stored representation (3) of the terrain which serves for the alert-generator means.

However, the means described allow, more generally, automatic detection of the conditions representative of a supposedly correct landing, that is to say which has every reason to take place normally. This information item could form the subject of a simple display at the flight deck, or of other applications, which differ from alert vetoing. Of course, the parameters affecting the safety conditions are then to be tailored as a function of the application.

It is possible to envisage various ways of establishing a global alert vetoing condition CnG derived from the elementary conditions expressed above.

Applicants currently prefer the simplest way, which is equivalent to a logical AND of the five conditions. Stated another way, the vetoing means (102) are organized so as to veto the alert when all the foreseen conditions join together.

Preferably, the veto condition CnG is evaluated repetitively continually, at a sufficiently fast rate, for example typically every 0.5 seconds. However, this repetitive calculation can be limited to the case where a runway is sufficiently close.

Vetoing ceases as soon as the condition ceases to be satisfied. However, it is conceivable to act otherwise, at least in certain cases. In other words, these veto means (102) veto the alert only so long as all the foreseen conditions join together; nevertheless, these veto means (102) can be frozen in the veto state, as a function of a special condition (Cx) implying for example that the altitude of the aircraft is less than a chosen threshold value.

Thus, Applicants envisage that the veto will persist by exception (function 295), in the presence of a condition Cx which depends, for example, on one or more of the following conditions:

the height $D_z$ remains less than a threshold zmin, fixed for example at 90 feet, the condition CnAHS remains true, a veto has already been obtained at the point 103 of FIG. 3 at the conclusion of the previous cycle of calculations.

This exception signifies that the veto is maintained if the aircraft is very low. The condition that the phases of the landing which have already taken place are normal, and/or that the aircraft has remained in the horizontal approach sector may be added thereto.

In the description, the point G serves as reference in several respects. It is naturally possible to take another point as reference. What is essential is to preserve a good definition of the nominal point of grounding of the landing path.

The dynamic aspects, relating to the convergence of the path of the aircraft towards the identified runway, are very relevant in themselves, independently of the static aspects, which may conceivably be modified or even omitted. In this regard it will be observed that the dynamic conditions derived from the templates HDG and VDG may be sufficient to indicate a correct landing approach, at least in certain cases.

Besides this, the qualifier "dynamic" implies that the motion of the aircraft is taken into account, in particular through its instantaneous speed; it does not exclude the possibility of also taking its position into account, as is the case for the horizontal dynamic subcondition in the example described.

Likewise, the processing in the horizontal plane can be separated from the processing in the vertical plane, although these processings interact partially.

Applicants currently deem the static aspects to be important. Thus, a volumewise approach sector is defined by the horizontal approach sector SHA, and the vertical approach sector VSG. However, in so far as it would be necessary to define a priority between the two, Applicants also deem the horizontal plane to be more important than the vertical plane.

Thus, the subcondition currently regarded as the most important is the horizontal static subcondition CnAHS. It is deemed preferable for it to be interdictive. It will be noted that it plays a privileged role in the unit 295 of FIG. 3. For the remainder, variants may be envisaged.

Moreover, the principle is that all the airport data are contained in the database 100. However, it may be admitted that in addition to the "constants", the unit 101 contains default values for the case where data might be missing from the database 100 or might be incorrect, for example as regards the geometry of the runway; the unit 101 may also contain one or more sets of standard values, which can be designated individually by codes, for the geometry of the runway in particular.

It is also possible to designate in the airports database one or more predefined standard approach sectors, from which particular airports would be excepted and would be assigned specific approach sectors, defined in detail by their template and/or their outline. In particular, the points W and E as well as W2 and E2 may be placed asymmetrically with respect to the point G.

The individual capabilities of each type of aircraft may be taken into account with regard to those parameters and constants of the invention which are linked, directly or indirectly, with the approach speed.

Instead of being stored in the database, some at least of the "airport information" can be transmitted to the aircraft just before landing. This is appropriate in particular in the case of aircraft carriers and/or seaplanes.

Numerous parameters and constants for which specific values are given appear in the example described. The values indicated are those regarded as currently preferable, in view of the studies conducted by Applicants. These parameters are however liable to alter, especially as a function of the applicable standards, of the type of aircraft concerned, and of the approach conditions for the runways.

| Appendix of formulae | |
|---|---|
| CnAS = CnAHS ∩ CnAVS | (I) |
| CnAD = CnHD ∩ CnAVD | (II) |
| CnG = CnC ∩ CnAS ∩ CnAD | (III) |
| CnA = CnAS ∩ CnAD | (IV) |
| CnG = CnC ∩ CnA | (V) |
| CnA = CnAHS ∩ CnAHD ∩ CnAVS ∩ CnAVD | (VI) |
| CnA = CnAH ∩ CnAV | (VII) |
| { CnAH = CnAHS ∩ CnAHD<br>CnAV = CnAVS ∩ CnAVD | (VIII) |
| CnC = CnC1 ∩ (CnC2 ∪ CnC3) | (X) |
| { α = min(β, γ)<br>CnAHS = (α ∈ HSG($D_h$)) | (XI) |
| CnAHD = (δ ∈ HDG(Dhd)) | (XII) |
| CnAVS = ($Z_A$ ∈ VSG($D_h$)) | (XIII) |
| CnAVD = ($V_z$ ∈ VDG($h_z$)) | (XIV) |

Notation:
∩ denotes the logical AND function
∪ denotes the logical OR function

What is claimed is:

1. Landing aid device, comprising processing means, which receive on the one hand aircraft path data, and on the other hand data regarding the position of at least one runway, wherein the processing means comprises:
   calculation means able to supply a state signal comprising at least one condition which is a function of the path data and of the runway data, this function being chosen so as to express the fact that the path of the aircraft converges towards the runway;
   first means capable of generating an alert in the event of the imminence of an aircraft/ground collision; and
   second means capable of vetoing said alert in the presence of a veto signal, wherein this veto signal is derived from the state signal.

2. Device according to claim 1, characterized in that the calculation means are organized so as to define a volume which possesses a chosen outline, positioned in a chosen manner with respect to said runway, and in that the state signal comprises a so-called static condition, pertaining to the current position of the aircraft to this volume.

3. Device according to claim 1, characterized in that the state signal comprises a so-called dynamic condition, pertaining to the convergence of a predicted path of the aircraft towards said runway, according to a chosen criterion.

4. Device according to claim 1, characterized in that the runway is defined by a representation stored in memory.

5. Device according to claim 1, characterized in that the calculation means are organized so as to define the said volume with the aid of a horizontal approach sector, by projection on a plane containing the said runway, and in that the static condition comprises a horizontal static subcondition, representative of the coincidence of the current position of the aircraft with this horizontal approach sector.

6. Device according to claim 5, characterized in that the data regarding the position of the runway comprise a representation of a reference point, in the guise of nominal point of grounding of the landing path, together with the orientation of the runway axis in the landing direction;
   in that the calculation means are organized so as to define two auxiliary points, situated at chosen distances either side of the reference point, on a straight line transverse to said identified runway and passing through the reference point; and
   in that the horizontal approach sector is delimited laterally by two lines which depart respectively from said two auxiliary points and diverge on either side of the runway axis, receding from the runway, up to a maximum distance with respect to the reference point.

7. Device according to claim 6, characterized in that the calculation means are organized so as to calculate the angles between the axis of the runway and the straight lines joining the current position of the aircraft to the two auxiliary points, respectively, whilst the horizontal approach sector comprises points for which the smaller of the two angles is less than an angle/distance limit curve, part of which curve is decreasing with the reduction in the distance from the aircraft to the reference point.

8. Device according to claim 7, characterized in that the decrease in the limit curve goes from around 40° for a distance of around 4000 meters to around 8° for a distance of around 900 meters.

9. Device according to claim 6, characterized in that the horizontal approach sector furthermore comprises a substantially rectangular zone, one side of which is defined by said two auxiliary points, and the opposite side of which passes through a point situated a chosen distance downstream of the reference point on the runway axis.

10. Device according to claim 3, wherein the dynamic condition comprises a horizontal dynamic subcondition, representative of the fact that a series of position, projected in the plane containing said runway, of the predicted path of the aircraft, satisfies a criterion of convergence towards runway.

11. Device according to claim 10, characterized in that the calculation means are organized so as to calculate the angle between the horizontal projection of the approach heading of the aircraft and the axis of the runway, so as to determine two boundaries which can be likened to a part at least of the said horizontal approach sector, as well as a margin, derived from the distance between the horizontal position of the aircraft and the more remote of the two boundaries, except if the aircraft is receding from both boundaries simultaneously; and in that the horizontal dynamic subcondition is satisfied when the said approach heading is less than a heading/margin limit curve, an intermediate part of which limit curve is decreasing with the reduction in the said margin.

12. Device according to claim 11, characterized in that the approach heading is defined on the basis of a direction vector departing from the current position of the aircraft together with a measurement and a direction which are derived from the instantaneous horizontal speed of the aircraft, and from the angle which this vector forms with the axis of the runway.

13. Device according to claim 2, characterized in that the static condition comprises a vertical static subcondition, representative of the presence of the aircraft inside a vertical approach sector.

14. Device according to claim 13, characterized in that the calculation means are organized so as to define two other auxiliary points, one situated on the runway axis a chosen distance upstream of the reference point, the other a chosen distance downstream of the reference point and at a chosen height, and in that the vertical approach sector comprises the points whose distance upstream of the reference point is less than a threshold, and which lie between a straight line of slope which decreases downstream and passes through the first point and a straight line of slope which decreases downstream and passes through the second point, the second slope being greater than the first.

15. Device according to claim 3, characterized in that the dynamic condition comprises a vertical dynamic subcondition, representative of the fact that positions of the predicted path of the aircraft satisfy a criterion of convergence to the said identified runway, in a vertical plane intersecting the said runway.

16. Device according to claim 13, characterized in that the dynamic condition comprises a vertical dynamic subcondition, representative of the fact that positions of the predicted path of the aircraft satisfy a criterion of convergence to the said identified runway, in a vertical plane intersecting the said runway; in that the calculation means are organized so as to establish the vertical speed of the aircraft towards the ground, and the residual height of the aircraft above the bottom boundary of the vertical approach sector; and in that the vertical dynamic subcondition is satisfied when the said residual height is greater than a height/speed limit curve, an intermediate part of which limit curve is decreasing with the reduction in speed towards the ground.

17. Device according to claim 1, characterized in that the state signal comprises a condition regarding the configuration of the aircraft.

18. Device according to claim 17, characterized in that the condition regarding the configuration of the aircraft comprises a condition pertaining to the lowering of the landing gear, and at least one condition relating to the flaps.

19. A landing aid device, comprising:
  an alert generator capable of generating an alert in the event of the imminence of an aircraft/ground collision;
  a calculator, which receives on the one hand aircraft path data, and on the other hand data regarding the position of at least one runway, and which is able to supply a state signal indicating at least one condition in which the path of the aircraft converges towards the runway; and
  an alert inhibitor, responsive to said state signal, for inhibiting said alert generator and preventing generation of said alert.

* * * * *